(12) United States Patent
He et al.

(10) Patent No.: US 8,594,023 B2
(45) Date of Patent: Nov. 26, 2013

(54) QUASI-DYNAMIC SPECTRUM ACCESS FOR INTERNET OF THINGS (IOT) APPLICATIONS

(75) Inventors: Ting He, Piermont, NY (US); Kang-Won Lee, Nanuet, NY (US); Yonghua Lin, Beijing (CN); Qing Wang, Beijing (CN); Murtaza Zafer, White Plains, NY (US); Hai Zhan, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 149 days.

(21) Appl. No.: 13/328,259

(22) Filed: Dec. 16, 2011

(65) Prior Publication Data

US 2013/0155879 A1  Jun. 20, 2013

(51) Int. Cl.
*H04Q 7/00* (2006.01)
*H04Q 7/24* (2006.01)

(52) U.S. Cl.
USPC .......................................... 370/328; 370/338

(58) Field of Classification Search
USPC .......................................... 370/328–334, 338
See application file for complete search history.

(56) References Cited

U.S. PATENT DOCUMENTS

| | | | |
|---|---|---|---|
| 7,885,229 B2 * | 2/2011 | Huttunen et al. | 370/329 |
| 2009/0124206 A1 | 5/2009 | Kwon et al. | |
| 2009/0141662 A1 | 6/2009 | Gurney et al. | |
| 2009/0196180 A1 * | 8/2009 | Bahl et al. | 370/235 |
| 2010/0105332 A1 | 4/2010 | McHenry et al. | |
| 2010/0296404 A1 * | 11/2010 | Quadri et al. | 370/252 |
| 2012/0294168 A1 * | 11/2012 | Freda et al. | 370/252 |
| 2013/0064197 A1 * | 3/2013 | Novak et al. | 370/329 |

FOREIGN PATENT DOCUMENTS

| | | |
|---|---|---|
| GB | 2488733 A | 9/2012 |
| WO | WO2009118155 A1 | 10/2009 |
| WO | 2012051157 A1 | 4/2012 |

OTHER PUBLICATIONS

UK IPO Search Report for International Appl. No. GB1221998.6; Date of Mailing: May 23, 2013, 4 pages.
Manuj Sharma et al.; Residual White Space Distribution-Based Opportunistic Channel Access for Cognitive Radio Enabled Devices, SIGCOMM '10; Aug. 30-Sep. 3, 2010; New Delhi, India; SIGCOMM; Abstract, Section 4, p. 1.
Peng Zhang et al.; "Spectrum Sensing Based on Blindly Learned Signal Feature"; 2010; 12th IEEE International Conference on Communication Technology (ICT 2010); IEEE; Abstract, Introduction, p. 1, Conclusions; p. 6; Feb. 18, 2011.

(Continued)

*Primary Examiner* — Hong Cho
(74) *Attorney, Agent, or Firm* — Cantor Colburn LLP; Dwayne Nelson

(57) ABSTRACT

Spectrum access for Internet of things (IOT) applications including receiving information about expected use by a primary user of a spectrum band in a radio frequency spectrum. The spectrum band is classified into at least two working modes based on the expected use. The spectrum band is sensed to determine a current access pattern of the primary user. Based on the classifying and the sensing, one of the working modes is selected as a current working mode of the primary user. Transmissions are scheduled on the spectrum band using a current schedule that is responsive to the current working mode of the primary user. If the current working mode of the primary user changes, the sensing, selecting, scheduling, and determining whether the current working mode has changed are re-performed. Otherwise, the transmission scheduling and determining if the current working mode has changed are re-performed.

25 Claims, 6 Drawing Sheets

(56) References Cited

OTHER PUBLICATIONS

Xiao Yu Wang et al.; Extended Knowledge Based Reasoning Approach to Spectrum Sensing for Cognitive Radio, IEEE Transactions on Mobile Computing; vol. 9; 2010; IEEE; Summary, Introduction; p. 2.

Youping Zhao; Enabling Cognitive Radios through Radio Environment Maps, Ph.D. Thesis; Faculty of the Virginia Polytechnic Institute and State University ProQuest; Abstract—pp. 1-188—May 8, 2007.

* cited by examiner

QUASI-DYNAMIC SPECTRUM ACCESS FOR INTERNET OF THINGS (IOT) APPLICATIONS

BACKGROUND

The present invention relates generally to wireless networks, and more specifically to a spectrum access mechanism for Internet of things (IOT) applications.

The Internet has adopted many new technologies as it has evolved to meet the changing needs of industry and society. This flexibility has been a factor in its growth, and today's Internet spans the globe and brings voice, video, data, and information to billions of people. Converging fixed and wireless technologies help make the Internet a ubiquitous infrastructure, always accessible and always on, supporting a wide range of activities. An IOT refers to an overall infrastructure (hardware, software, and services) supporting the seamless integration of physical things (e.g., everyday objects) into information networks. These objects are active participants in business and information processes, exchanging data including their identities, their physical properties, and information 'sensed' about their environment.

Cognitive radio (CR) is one paradigm for wireless communication in which either a network or a wireless node changes its transmission or reception parameters to communicate efficiently while avoiding interference with other users of the network bands. This alteration of parameters is based on the active monitoring of several factors, such as radio frequency spectrum, user behavior, and network state.

Another paradigm for sharing network frequencies is spatial frequency reuse, which has led to the development of cellular technology by allowing a significant improvement in the economic use of frequencies. Spatial frequency reuse divides an area to be serviced into cells (radio zones). For easier manipulation these cells may be modeled as hexagons with base stations in the middle of the cells. Each cell receives a subset of the frequencies and two neighboring cells do not receive the same frequency in order to avoid mutual interference. When moving from one cell to another during a conversation, an automatic channel/frequency change (handover) occurs.

SUMMARY

An embodiment is a method that includes receiving information about an expected use of a spectrum band in a radio frequency spectrum, the expected use by a primary user and the receiving at a mobile device. The expected use of the spectrum band is classified into at least two working modes, the classifying responsive to the information about the expected use. The spectrum band is sensed to determine a current access pattern of the primary user. One of the working modes is selected as a current working mode of the primary user, the selecting responsive to the classifying and to the current access pattern of the primary user. Transmissions are scheduled on the spectrum band using a current schedule that is responsive to the current working mode of the primary user. The scheduling is as a secondary user of the spectrum band. It is determined whether the current working mode of the primary user has changed. The sensing, selecting, scheduling, and determining are re-performed if the current working mode of the primary user has changed. The scheduling and determining are re-performed if the current working mode of the primary user has not changed.

Another embodiment is a device that includes a processor configured to perform a method. The method includes receiving information about an expected use of a spectrum band in a radio frequency spectrum by a primary user. The expected use of the spectrum band is classified into at least two working modes, the classifying responsive to the information about the expected use. The spectrum band is sensed to determine a current access pattern of the primary user. One of the working modes is selected as a current working mode of the primary user, the selecting responsive to the classifying and to the current access pattern of the primary user. Transmissions are scheduled on the spectrum band using a current schedule that is responsive to the current working mode of the primary user. The scheduling is as a secondary user of the spectrum band. It is determined whether the current working mode of the primary user has changed. The sensing, selecting, scheduling, and determining are re-performed if the current working mode of the primary user has changed. The scheduling and determining are re-performed if the current working mode of the primary user has not changed.

Another embodiment is a computer program product that includes a tangible storage medium readable by a processing circuit and storing instructions for execution by the processing circuit for performing a method. The method includes receiving information about an expected use of a spectrum band in a radio frequency spectrum, the expected use by a primary user and the receiving at a mobile device. The expected use of the spectrum band is classified into at least two working modes, the classifying responsive to the information about the expected use. The spectrum band is sensed to determine a current access pattern of the primary user. One of the working modes is selected as a current working mode of the primary user, the selecting responsive to the classifying and to the current access pattern of the primary user. Transmissions are scheduled on the spectrum band using a current schedule that is responsive to the current working mode of the primary user. The scheduling is as a secondary user of the spectrum band. It is determined whether the current working mode of the primary user has changed. The sensing, selecting, scheduling, and determining are re-performed if the current working mode of the primary user has changed. The scheduling and determining are re-performed if the current working mode of the primary user has not changed.

A further embodiment is a system that includes a media access control (MAC) layer module and a physical (PHY) layer module in communication with the MAC layer module. The MAC layer module is configured for receiving information about an expected use by a primary user of the spectrum band; classifying the expected use by the primary user into at least two working modes, the classifying responsive to the information about the expected use; and selecting one of the working modes as a current working mode of the primary user, the selecting responsive to the classifying and to a current access pattern of the primary user on the spectrum band. The PHY layer module is configured for sensing the spectrum band to determine the current access pattern of the primary user; scheduling the transmissions on the spectrum band using a current schedule that is responsive to the current working mode of the primary user; determining whether the current working mode of the primary user has changed; communicating the detected change to the MAC layer module if the current working mode of the primary user has changed, wherein the MAC layer module re-performs the selecting responsive to the communicating; and if the working mode of the primary user has not changed re-performing the scheduling and determining.

Additional features and advantages are realized through the techniques of the present embodiment. Other embodiments and aspects are described herein and are considered a part of the claimed invention. For a better understanding of the invention with the advantages and features, refer to the description and to the drawings.

BRIEF DESCRIPTION OF THE SEVERAL VIEWS OF THE DRAWINGS

The subject matter that is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
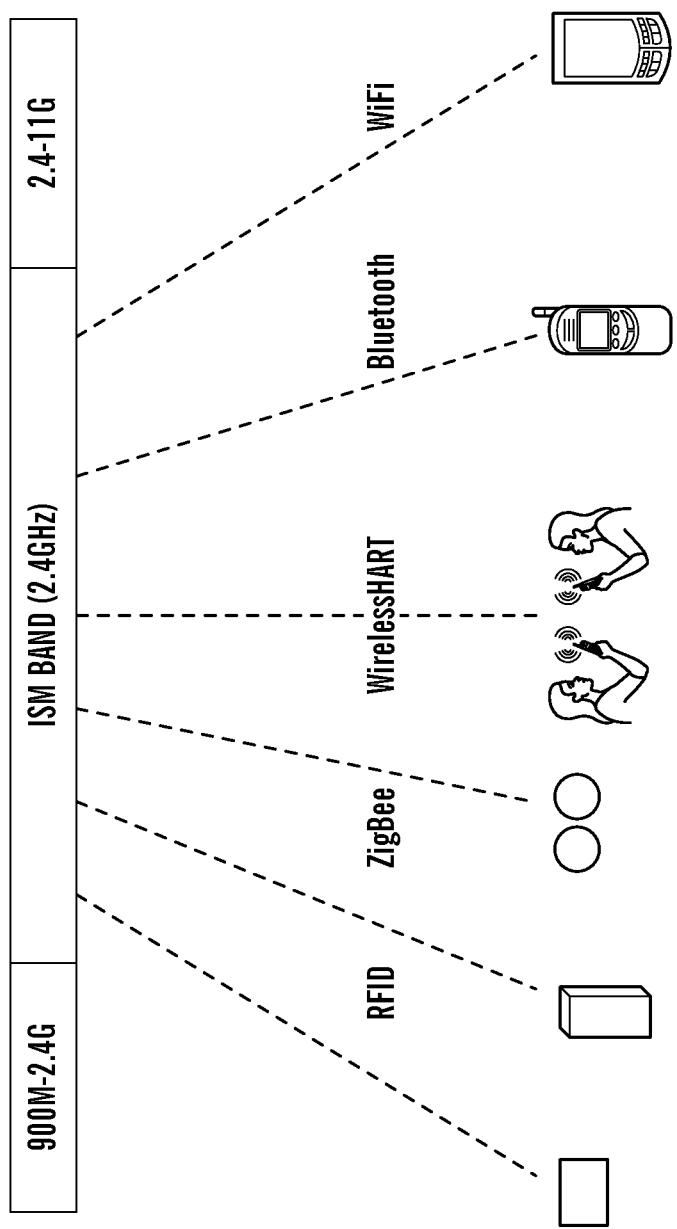
FIG. 1 illustrates a block diagram of various radio devices that may be utilized by Internet of things (IOT) applications in accordance with an embodiment.

An embodiment of the present invention is a quasi-dynamic spectrum access mechanism for Internet of things (IOT) applications that improves spectrum utilization efficiency and avoids spectrum collisions caused by multiple terminals with various standards working in the same spectrum band. Prior knowledge of the primary users, which is known in most IOT applications, is utilized to divide their spectrum utilization patterns into a finite set of working modes (describe more in detail later). Through spectrum sensing and classification, a current working mode of the primary users is deduced in an efficient manner. Based on the deduced current working mode, static spectrum scheduling and management for secondary users is utilized, removing the need to perform spectrum sensing before sending each data packet. At the same time, a thread is set to monitor the changes of the primary users with some distinct indications, such as deviation of the channel state from what is expected under the normal operation of the secondary users (no extra computation introduced). If changes of the primary users' working mode are detected, a bootstrapping and spectrum scheduling process is repeated to match those changes.

Embodiments described herein, when compared, for example to contemporary cognitive radio (CR) approaches, reduce the complexity of spectrum access and management, reduce power consumption of the secondary user, and are responsive to working mode changes.

As used herein, the term "primary user" refers to an existing user of a spectrum band, which can be an IOT application or any wireless user. For example, for an IOT application coexisting (in space and spectrum) with WiFi/WiMax networks, the set of WiFi/WiMax users is the primary user; for an IOT application coexisting with other existing IOT applications, the set of existing applications is the primary user. As used herein, the term "secondary user" refers to the IOT application under consideration that is to be deployed in coexistence with existing networks. In an embodiment, the primary user is a licensed user who has purchased use of the spectrum band and the secondary user is an unlicensed user who is using the spectrum band opportunistically and without interfering with the primary user.

As used herein, the term "spectrum" and "radio frequency spectrum" are used interchangeably to refer to a range of transmission frequencies. As used herein, the terms "spectrum band" and "frequency band" and "channel" are used interchangeably to refer to a particular frequency in the spectrum.

As used herein the term "Internet of things" or "IOT" refers to the networked interconnection of everyday objects, such as sensor devices (e.g., video cameras, chemical sensors, audio sensor, motion sensors) with network interface, smart phones, RFIDs and RFID readers, water/electricity meters with wireless networking capability, and controllers and actuators, etc. Wireless communication systems and networks are the fundamental infrastructure of IOT, which can ensure data collections and data access anytime and anywhere. For wireless communications, limited spectrum resource is one of the key issues to solve. Currently, most wireless communication systems work at a radio frequency of from 1 GigaHertz (GHz) to 5 GHz, which causes competition in spectrum access. For example, wireless fidelity (WiFi) operates at a frequency band of 2.4 GHz, global system for mobile communications (GSM) at 900 to 1800 MegaHertz (MHz), and worldwide interoperability for microwave access (WiMAX) (16 d) at 3.5 GHz. Traditionally, competition for spectrum access is resolved by assigning (e.g., buying) a spectrum band for each specific network deployment. This results in static spectrum planning and management. In IOT applications, however, the IOT network has to coexist with existing networks, often with overlapping spectrum.

FIG. 1 illustrates a block diagram of various radio devices that may be utilized by Internet of things (IOT) applications in accordance with an embodiment. As shown in FIG. 1, various radio access devices are concentrated in the industrial, scientific, and medical (ISM) frequency spectrum band at 2.4 GHz. Example radio access devices concentrated in the ISM spectrum band include, but are not limited to: radio frequency identification (RFID) devices, ZigBee devices, wireless highway addressable remote transmitter (WirelessHART) devices, Bluetooth devices, and WiFi devices.

Figure 2:
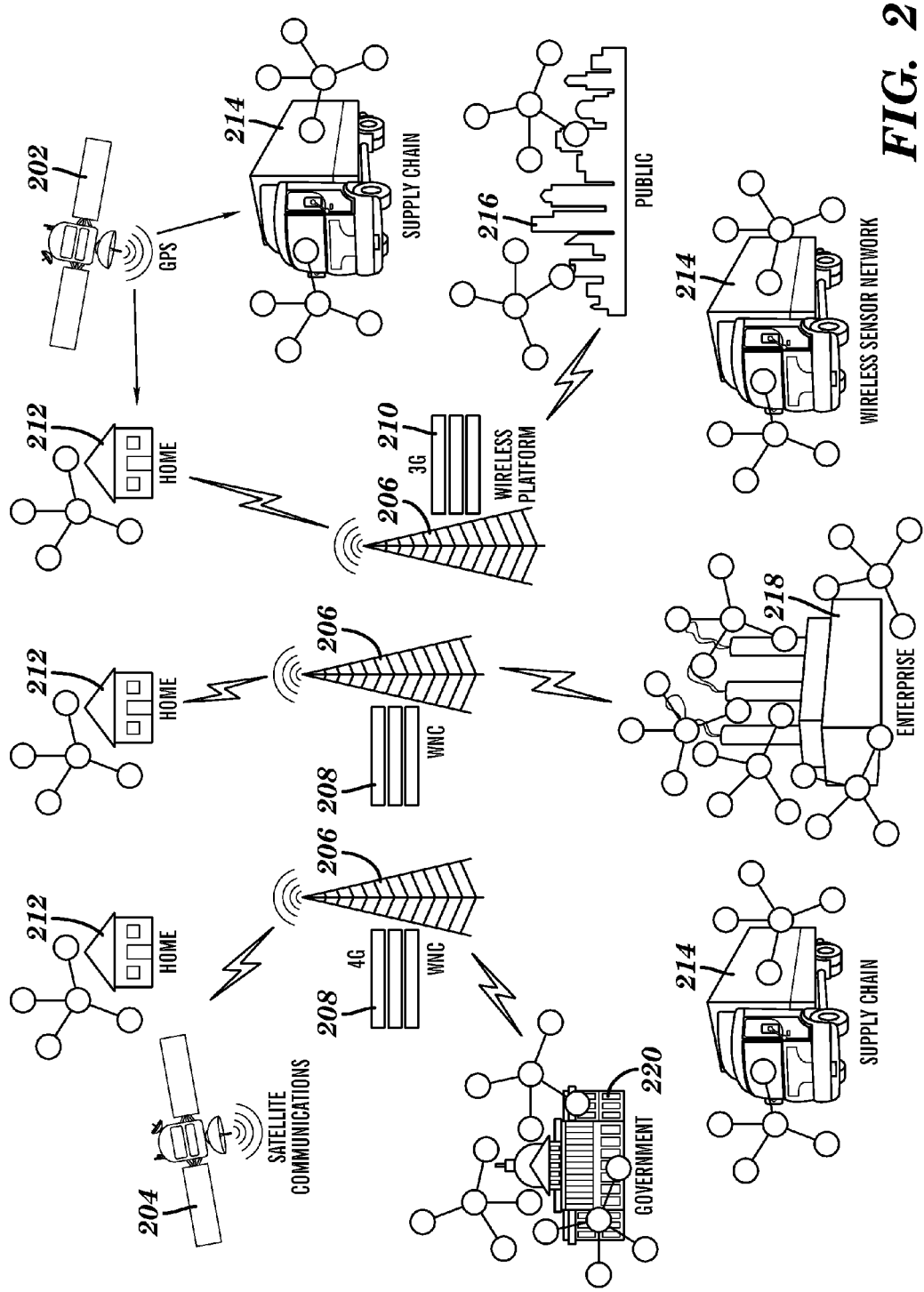
FIG. 2 illustrates a block diagram of several different types of wireless networks and different types of user locations in accordance with an embodiment.

FIG. 2 illustrates a block diagram of several different types of wireless networks and different types of user locations in accordance with an embodiment. FIG. 2 shows the proliferation of the use of wireless devices over wireless networks at homes 212, supply chain locations 214, public locations 216, business enterprise locations 218, and government locations 220. This list is not meant to be exhaustive as wireless networks may be used at other types of locations. FIG. 2 also shows the proliferation of different types of wireless network communication (WNC) including satellite GPS networks 202, communication networks 204, radio towers 206, fourth generation (4G) mobile telecommunications 208, and third generation (3G) mobile telecommunications 210. This list is not meant to be exhaustive as other types of WNC may also be implemented.

Due to the large number of radio access devices that share the same frequency band, and to the proliferation of the use of wireless networks and wireless devices, the spectrum resource is becoming scarce. Because frequency bands are being shared, it is critical to enable protocol co-existence, i.e., to avoid wireless interference between devices communicating using different protocols.

One proposed method for improving spectrum band utilization is based on spatial frequency reuse. This method, widely used for cellular communications, partitions the network area into micro cells and assigns different frequencies to adjacent cells. Advantages of a spatial frequency reuse method are that it is simple and a relatively easy way to manage the spectrum bands. Disadvantages are low spectrum band utilization due to the static nature of the assignment and that it does not apply to IOT applications where protocol co-existence (e.g., between a primary user and a secondary user) within a spectrum band is required.

Another proposed method for improving spectrum band utilization is based on the techniques of cognitive radio (CR), which allows a secondary user to access a spectrum band opportunistically based on spectrum sensing. The secondary user then evacuates the spectrum band when the primary user returns. The techniques used by the CR approach are applicable to IOT applications with overlapping spectrums, but at a high cost. CR uses complex algorithms for spectrum sensing and access management. For example, a CR radio may periodically scan the spectrum for some time (a subinterval of the scanning period) to detect the presence of the primary user. The scanning period and lasting time are important parameters to the design. In particular, the scanning period has to be sufficiently short and the lasting time sufficiently long so that primary user's return can be detected promptly with confidence. All these activities consume large amounts of power. Minimizing power usage is vital to IOT related applications because the power supply for mobile devices is often limited.

Embodiments described herein are suitable for spectrum band management for IOT applications. Embodiments leverage the flexibility of CR without its high overhead. It can be observed that a main cause of CR overhead is the frequent spectrum sensing that is required to avoid interfering with the primary users. The way that contemporary implementations of CR observe primary user activities is through spectrum sensing. This is contrasted with the environment of IOT related applications, where some prior knowledge may be available about the spectrum usage of coexisting applications (e.g., the frequency band, the working time, the working location, etc.). Embodiments utilize available prior knowledge to remove unnecessary spectrum sensing activities, thus resulting in a reduced overhead when compared to contemporary CR. Embodiments do not rely on prior knowledge alone, as the working mode in a specific deployment is usually not known precisely and may change over time. Hence, an embodiment is a quasi-dynamic spectrum access mechanism for IOT related applications to improve the spectrum utilization with the flexibility of CR but at a substantially reduced overhead.

Figure 3:
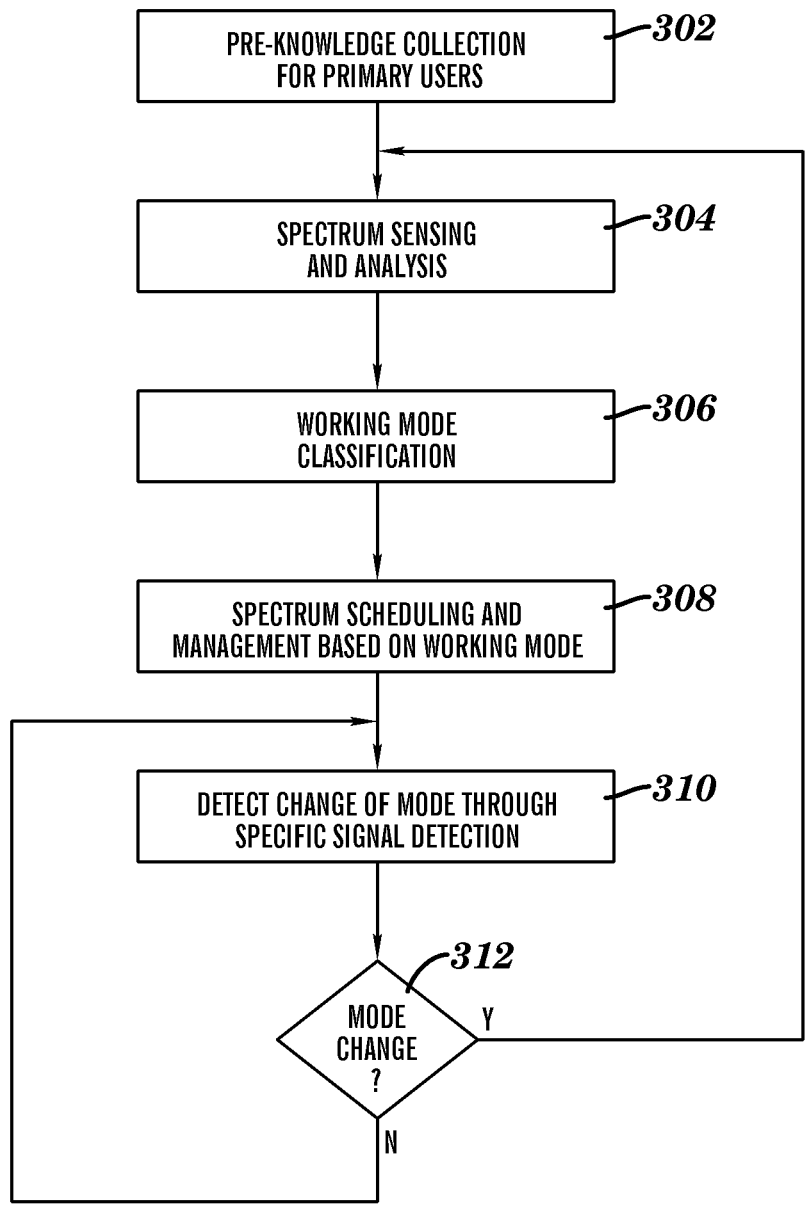
FIG. 3 illustrates a process flow for performing quasi-dynamic spectrum access in accordance with an embodiment.

FIG. 3 illustrates a process flow for performing quasi-dynamic spectrum access in accordance with an embodiment. In an embodiment, the process flow illustrated in FIG. 3 is implemented on a mobile device. The process shown in FIG. 3 starts at block 302 where prior knowledge about primary users in the spectrum is collected. This knowledge can include, but is not limited to: spectrum band(s) occupied, geographical area where the primary user operates, (temporal) transmission pattern, and how regular the transmission pattern is. In an embodiment the prior knowledge is collected from network planning systems for the original deployment of primary networks, such as the coverage, the geographical information, the service pattern, etc. In another embodiment, the prior knowledge is obtained by inferring spectrum usage parameters (e.g., temporal pattern and distribution over spectrum bands and geographical area) from historical transmission traces of the primary user in the bands and area of interest. In an embodiment, the collected data indicates that all or a subset of the primary users have two or more different spectrum band usage patterns. For a given primary user, each different spectrum band usage pattern associated with the primary user is referred to herein as a "working mode." The working mode of a primary user is not completely deterministic. Which working mode is used in a particular neighborhood at a particular time is unknown, and there may be uncertainty about the exact behavior of a primary user under a given working mode at a specific point in time.

In an embodiment, all or a portion of the processing in block 302 occurs prior to a mobile device transmitting any data on a spectrum band (e.g., during power-on). In another embodiment, all or a portion of the processing in block 302 occurs after the mobile device has transmitted data on the spectrum band using, for example, a CR methodology for transmitting the data.

At block 304, spectrum sensing and analysis is performed to determine the spectrum band(s) in use by current primary users of the spectrum. In an embodiment, the spectrum sensing and analysis is performed by measuring the received signal strength and performing signal detection in comparison with background noise to determine the presence/absence of primary user in a given spectrum band at a given point in time, as is done by the energy detector (ED) in CR. At block 306, the data collected in blocks 302 and 304 is used to determine a "current working mode" of the primary user(s). The current working mode for a primary user is selected from the list of working modes associated with the primary user by performing workload classification. In an embodiment the process of classifying the workload includes computing the deviation (e.g., measured by Hamming distance) between the observed spectrum occupancy pattern in 304 and the expected spectrum occupancy pattern under each working mode, and then selecting the working mode yielding the minimum deviation. Thus, the determination of the current working mode of a primary user is based on both prior knowledge (e.g., external knowledge, historical data) and runtime observations.

At block 308, spectrum block scheduling and management is performed based on the current working mode(s) of the primary user(s). Secondary transmissions are performed on the spectrum band by the mobile device using information about the current working mode(s) to more fully utilize the spectrum band while avoiding collisions with the primary user(s). The performance of secondary transmission results in data being sent from an IOT device to another IOT device or an IOT receiving location, via the shared spectrum band. As used herein, the term "transmission" refers to data being sent over the spectrum band. In an embodiment, the processing at block 308 is the same processing that is used by contemporary mobile devices that perform transmission scheduling.

At block 310, change detection is performed to detect any change of working mode by the primary user(s). A change of mode can be detected in any manner known in the art. Signal to noise ratio (SNR) and/or bit error rate (BER) may be monitored to detect early signs of a working mode change. A lowered signal to noise ratio (SNR) and/or an increased bit error rate (BER) may both indicate a working mode change. A programmable threshold number representing an absolute SNR or a percentage change in SNR may be used by embodiments to initiate a probing of the channel. Similarly, a programmable threshold number representing an absolute BER or a percentage change in BER may be used by embodiments to initiate a probing of the channel. In addition, the channel can be probed periodically (e.g., by using a timer set for a programmable time interval and probing the channel when the programmable time interval has elapsed) independent of the SNR/BER. Such channel probing is used to determine if the current working mode has changed. An example of channel probing is described later in reference to FIG. 5.

At block 312, it is determined if the working mode of the primary user(s) has changed. If the working mode has changed, the processing continues at block 304 to initiate a rescan of the spectrum. If the working mode has not changed, then processing continues at block 310. In an embodiment, the processing in blocks 304 through 308 is performed only when a mobile device is powered on, or prior to performing a transmission in a spectrum, or in response to a mode change being detected once communications are in process on a spectrum band. In another embodiment, blocks 304 through 308 are also preformed on a periodic basis (programmable). Thus, the overhead power consumption of dynamic spectrum access are reduced for mobile devices running IOT applications by not requiring spectrum sensing to be performed prior to each transmission.

Embodiments described herein enable coexistence of a large number of wireless devices with existing protocols on an overlapping spectrum, in order to better utilize limited spectrum resources. An embodiment may be used to allow mobile devices (e.g., implementing IOT applications) to transmit data on a spectrum band as a secondary user when a primary user is not using all of the capacity of the spectrum band.

Embodiments may also be used during a migration from a legacy network system to a new network system to allow the legacy network and the new network to co-exist during migration. In this scenario, the legacy network system is the primary user and the new network system in the secondary user. The new network system may support a wider spectrum than the legacy network system. The wider spectrum includes the spectrum supported by the legacy network system and additional spectrum bands not supported by the legacy network system. By allowing the legacy network system and the new network system to co-exist in an efficient manner, embodiments support a gradual migration from the legacy network system to the new network system.

To support the quasi-dynamic spectrum access, in an embodiment there are some modifications in the physical (PHY) layer and the media access control (MAC) layer of a contemporary mobile terminal. In an embodiment, the detector for mode change uses the signal information obtained from normal PHY layer processing, such as the channel impulse response (CIR), SNR, and other parameters used by normal PHY processing. Thus, the embodiment will not cause an increase in the computing workload. After getting the spectrum assignment for a specified working mode, the PHY layer will reconfigure related system parameters to support the dynamic resource allocation.

Figure 4:
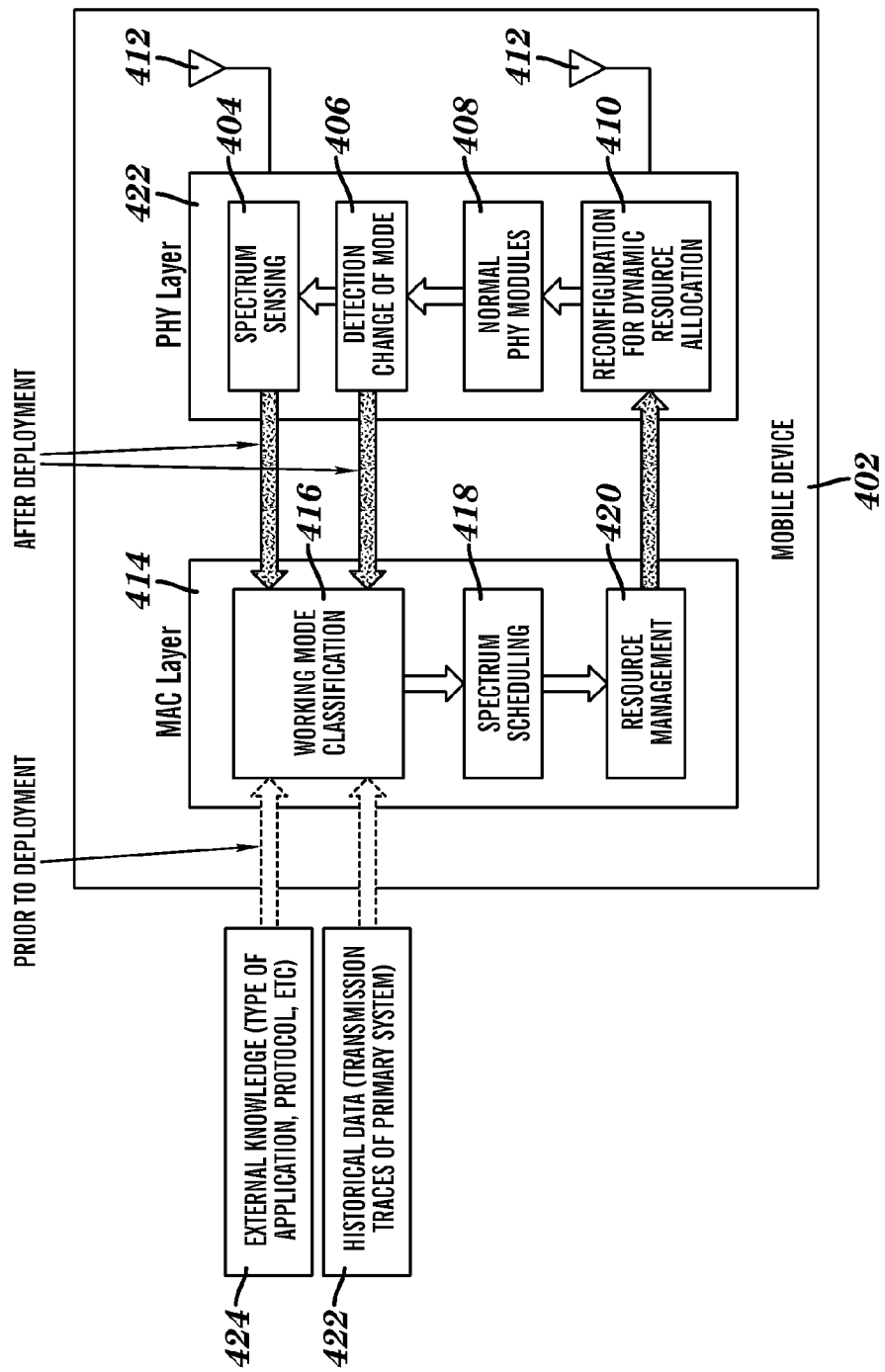
FIG. 4 illustrates a block diagram of a mobile device for performing quasi-dynamic spectrum access in accordance with an embodiment.

FIG. 4 illustrates a block diagram of a mobile device 402 for performing quasi-dynamic spectrum access in accordance with an embodiment. The mobile device 402 shown in FIG. 4 includes a MAC layer module 414, a PHY layer module 422, and two transceivers 412 (or alternatively, at least one transmitter and at least one receiver). As is known in the art, the MAC layer module 414 includes computer instructions used by the mobile device 402 to control access to the network medium (e.g., rules for managing the medium to avoid conflicts), and the PHY layer module 422 includes computer instructions to actually transmit/receive data on the network interface via a channel or spectrum band (assuming the device is equipped with software-define radio). As shown in the embodiment in FIG. 4, the MAC layer module 414 includes a working mode classification module 416 (e.g., to perform the processing described in reference to block 306 of FIG. 3), a spectrum scheduling module 418 (e.g., to perform part of the processing described in reference to block 308 of FIG. 3), and a resource management module 420 (e.g., to perform part of the processing described in reference to block 308 of FIG. 3). Also as shown in the embodiment in FIG. 4, the PHY layer module 422 includes a spectrum sensing module 404 (e.g., to perform the processing described in reference to block 304 of FIG. 3), a change-of-mode detection module 406 (e.g., to perform the processing described in reference to block 310 of FIG. 3), a reconfiguration for dynamic resource allocation module 410 (e.g., to perform part of the processing described in reference to block 308 of FIG. 3), and other PHY modules 408.

In an embodiment, the working mode classification module 416, spectrum sensing module 404, change-of-mode detection module 406, and reconfiguration for dynamic resource allocation module 410 include computer instructions (hardware and/or software) for implementing embodiments described herein. The spectrum scheduling module 418, resource management module 420, and normal PHY modules 408 utilized by embodiments are those typically found in contemporary mobile terminals that support, for example CR.

Input to the working mode classification module 416 includes prior knowledge about the primary user including external knowledge (e.g., type of application, protocol, etc.) 424 and historical data (e.g., transmission traces of primary system) 426. This prior knowledge is input to the working mode classification module 416 prior to the mobile device 402 communicating over a spectrum band (e.g., prior to deployment). Also input to the working mode classification module 416 is data from the spectrum sensing module 404 and data from the change-of-mode detection module 406. This data is input to the working mode classification module 416 after deployment. Also shown in FIG. 4 is data from the resource management module 420 being input to the reconfiguration for dynamic resource allocation module 410 in order to apply any updates to parameters being used in communicating via the spectrum band (e.g., because the current working mode has been changed). The new current working mode information is sent to the normal PHY modules 408 for use in transmitting data on the spectrum band.

Figure 5:
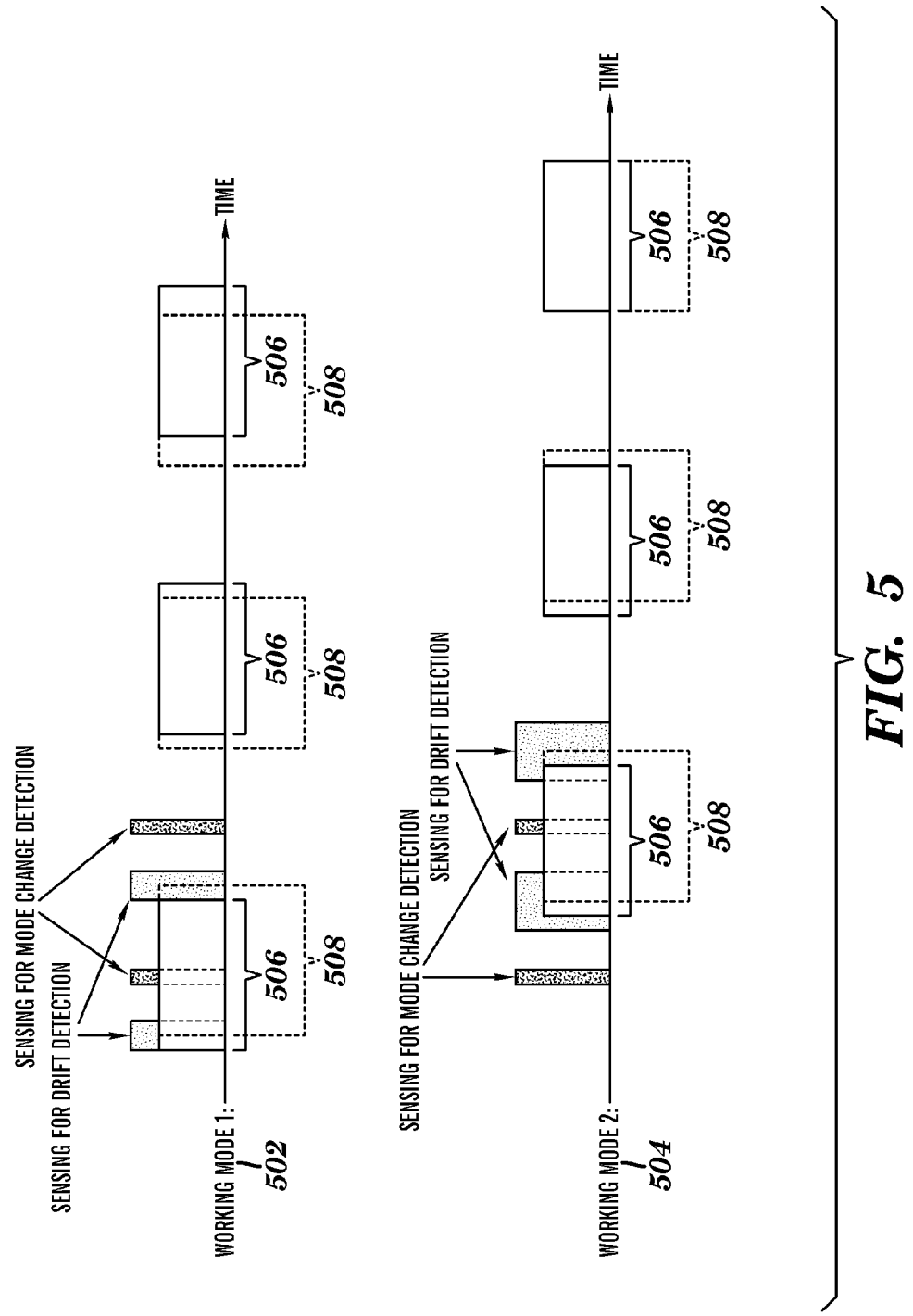
FIG. 5 illustrates timing of channel probing in accordance with an embodiment.

FIG. 5 illustrates timing of channel probing (as described, for example, in reference to block 310 of FIG. 3) in accordance with an embodiment. Two working modes on a single spectrum band where a primary user performs periodic transmissions are shown in FIG. 5, working mode one 502 (e.g., typically seen during third shift) and working mode two 504 (e.g., typically seen during first and second shifts). Based on the current working mode (either working mode one 502 or working mode two 504) a transmission has an expected time 508, and based on factors such as drift, each transmission has an actual time 506. As used herein, the term "data transmission drift" refers to gradual shift in the transmission times while maintaining the time interval between consecutive transmissions (e.g., caused by clock drift, power outage, system recalibration). It is important that the secondary user accounts for some amount of drift in transmissions by the primary user before transmitting data on the spectrum band. The amount of drift to be accounted for is determined by performing periodic sensing, or probing, for drift detection. The timing of the periodic sensing for drift detection is different for each of the working modes shown in FIG. 5. Also shown in FIG. 5 is sensing for mode change detection in order to verify that the current working mode is correct. In the embodiment shown in FIG. 5, the probing is performed on a periodic basis, at a point in time during a transmission cycle that does not vary depending on the current working mode. Alternatively, or additionally, probing for mode change detection is performed in response to detecting a lowered SNR and/or an increased BER.

Figure 6:
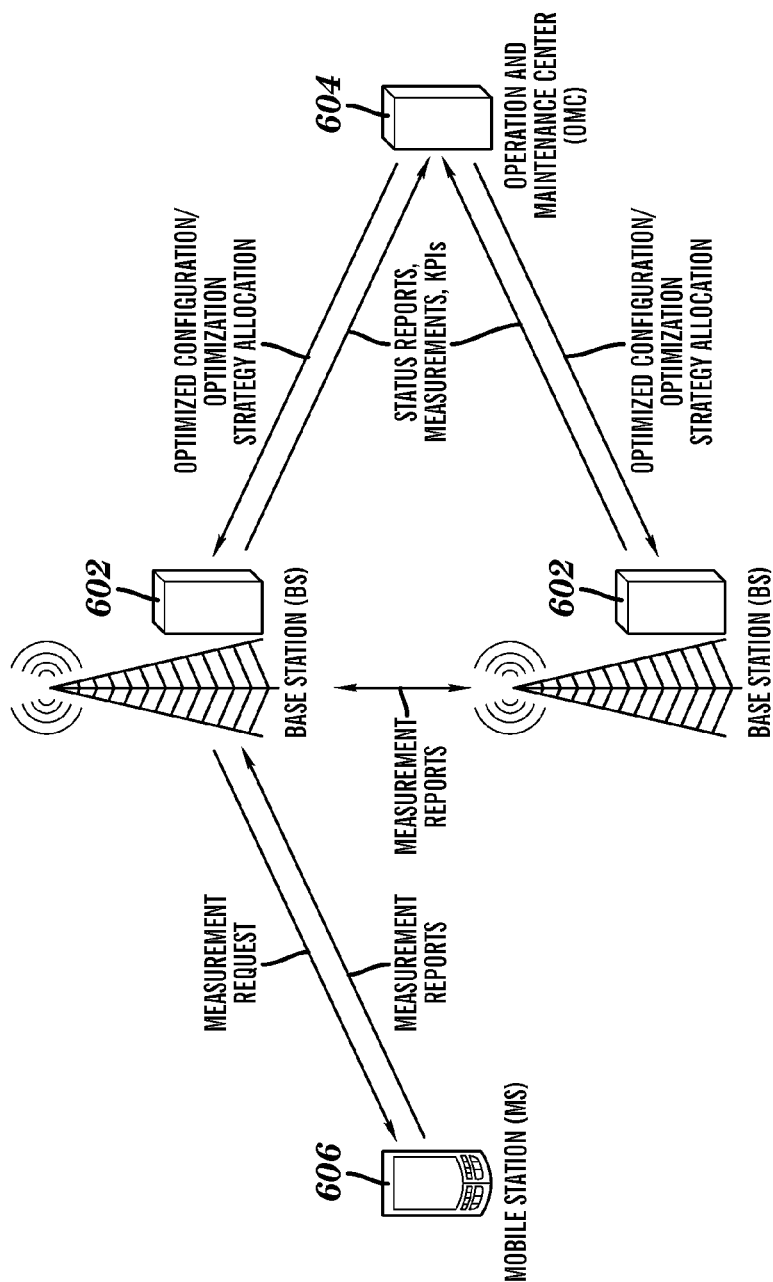
FIG. 6 illustrates of a block diagram of a self-organization network (SON) in accordance with an embodiment.

FIG. 6 illustrates a block diagram of a self-organization network (SON) in accordance with an embodiment that includes base stations 602, an operation and maintenance center 604, and a mobile station 606. A SON is characterized by self-configuration, self-optimization and self-healing of a network, to target improving the performance of next generation radio access network. In SON, the base stations 602 work under certain modes based on some prior knowledge of the whole network. During the cell network running, each mobile station 606 reports specific information to its base station to indicate some possible changes of the working mode, such as the channel SNR, the service pattern, etc. When the base station receives the information from the mobile station it's covered, it will pre-process this information and transmit it to the operation and maintenance center 604. After collecting the transmitted information from each base station, the maintenance center will decide whether to update the resource allocation and configurations of base stations or keep the current setting.

Technical effects and benefits include reduced complexity and reduced power consumption when compared, for example, to contemporary CR approaches.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one ore more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method comprising:
   receiving information about an expected use of a spectrum band in a radio frequency spectrum, the expected use by a primary user and the receiving at a mobile device;
   classifying the expected use of the spectrum band into at least two working modes, the classifying responsive to the information about the expected use;
   sensing the spectrum band to determine a current access pattern of the primary user;
   selecting one of the working modes as a current working mode of the primary user, the selecting responsive to the classifying and to the current access pattern of the primary user;
   scheduling transmissions on the spectrum band using a current schedule that is responsive to the current working mode of the primary user, the scheduling as a secondary user of the spectrum band;
   determining whether the current working mode of the primary user has changed;
   if the current working mode of the primary user has changed, re-performing the sensing, selecting, scheduling, and determining; and
   if the current working mode of the primary user has not changed, re-performing the scheduling and determining.

2. The method of claim 1, further comprising probing the spectrum band for a data transmission drift associated with the current working mode of the primary user, wherein the scheduling transmissions on the spectrum band is further responsive to the data transmission drift associated with the current working mode of the primary user.

3. The method of claim 1, wherein the determining whether the current working mode of the primary user has changed is responsive to a signal to noise ratio on the spectrum band.

4. The method of claim 1, wherein the determining whether the current working mode of the primary user has changed is responsive to a bit error rate on the spectrum band.

5. The method of claim 1, wherein the determining whether the current working mode of the primary user has changed is responsive to a probe of the spectrum band.

6. The method of claim 1, further comprising:
   determining that a programmable time interval has elapsed; and
   re-performing the sensing, selecting, scheduling, and determining whether the current working mode of the primary user has changed.

7. The method of claim 1, wherein the receiving, classifying, sensing, and selecting are performed in response to the mobile device being powered on.

8. A device comprising a processor configured to perform a method comprising:
   receiving information about an expected use of a spectrum band in a radio frequency spectrum, the expected use by a primary user;
   classifying the expected use of the spectrum band into at least two working modes, the classifying responsive to the information about the expected use;
   sensing the spectrum band to determine a current access pattern of the primary user;
   selecting one of the working modes as a current working mode of the primary user, the selecting responsive to the classifying and to the current access pattern of the primary user;
   scheduling transmissions on the spectrum band using a current schedule that is responsive to the current working mode of the primary user, the scheduling as a secondary user of the spectrum band;
   determining whether the current working mode of the primary user has changed;
   if the current working mode of the primary user has changed, re-performing the sensing, selecting, scheduling, and determining; and
   if the current working mode of the primary user has not changed, re-performing the scheduling and determining.

9. The device of claim 8, wherein the method further comprises probing the spectrum band for a data transmission drift associated with the current working mode of the primary user, wherein the scheduling transmissions on the spectrum band is further responsive to the data transmission drift associated with the current working mode of the primary user.

10. The device of claim 8, wherein the determining whether the current working mode of the primary user has changed is responsive to a signal to noise ratio on the spectrum band.

11. The device of claim 8, wherein the determining whether the current working mode of the primary user has changed is responsive to a bit error rate on the spectrum band.

12. The device of claim 8, wherein the determining whether the current working mode of the primary user has changed is responsive to a probe of the spectrum band.

13. The device of claim 8, wherein the method further comprises:
   determining that a programmable time interval has elapsed; and
   re-performing the sensing, selecting, scheduling, and determining whether the current working mode of the primary user has changed.

14. The device of claim 8, wherein the receiving, classifying, sensing, and selecting are performed in response to the device being powered on.

15. A computer program product comprising:
a tangible storage medium readable by a processing circuit and storing instructions for execution by the processing circuit for performing a method comprising:
receiving information about an expected use of a spectrum band in a radio frequency spectrum, the expected use by a primary user;
classifying the expected use of the spectrum band into at least two working modes, the classifying responsive to the information about the expected use;
sensing the spectrum band to determine a current access pattern of the primary user;
selecting one of the working modes as a current working mode of the primary user, the selecting responsive to the classifying and to the current access pattern of the primary user;
scheduling transmissions on the spectrum band using a current schedule that is responsive to the current working mode of the primary user, the scheduling as a secondary user of the spectrum band;
determining whether the current working mode of the primary user has changed;
if the current working mode of the primary user has changed, re-performing the sensing, selecting, scheduling, and determining; and
if the current working mode of the primary user has not changed, re-performing the scheduling and determining.

16. The computer program product of claim 15, wherein the method further comprises probing the spectrum band for a data transmission drift associated with the current working mode of the primary user, wherein the scheduling transmissions on the spectrum band is further responsive to the data transmission drift associated with the current working mode of the primary user.

17. The computer program product of claim 15, wherein the determining whether the current working mode of the primary user has changed is responsive to a signal to noise ratio on the spectrum band.

18. The computer program product of claim 15, wherein the determining whether the current working mode of the primary user has changed is responsive to a bit error rate on the spectrum band.

19. The computer program product of claim 15, wherein the determining whether the current working mode of the primary user has changed is responsive to a probe of the spectrum band.

20. The computer program product of claim 15, wherein the method further comprises:
determining that a programmable time interval has elapsed; and
re-performing the sensing, selecting, scheduling, and determining whether the current working mode of the primary user has changed.

21. A system comprising:
a media access control (MAC) layer module configured for:
receiving information about an expected use by a primary user of the spectrum band;
classifying the expected use by the primary user into at least two working modes, the classifying responsive to the information about the expected use; and
selecting one of the working modes as a current working mode of the primary user, the selecting responsive to the classifying and to a current access pattern of the primary user on the spectrum band; and
a physical (PHY) layer module in communication with the MAC layer module, the PHY layer module configured for:
sensing the spectrum band to determine the current access pattern of the primary user;
scheduling transmissions on the spectrum band using a current schedule that is responsive to the current working mode of the primary user;
determining whether the current working mode of the primary user has changed;
if the current working mode of the primary user has changed, communicating the change to the MAC layer module, wherein the MAC layer module re-performs the selecting responsive to the communicating; and
if the current working mode of the primary user has not changed, re-performing the scheduling and determining.

22. The system of claim 21, wherein the PHY layer module is further configured for probing the spectrum band for a data transmission drift associated with the current working mode of the primary user, wherein the scheduling transmissions on the spectrum band is further responsive to the data transmission drift associated with the current working mode of the primary user.

23. The system of claim 21, wherein the determining whether the current working mode of the primary user has changed is responsive to at least one of a signal to noise ratio on the spectrum band and a bit error rate on the spectrum band.

24. The system of claim 21, wherein the determining whether the current working mode of the primary user has changed is responsive to a probe of the spectrum band.

25. The system of claim 21, wherein the determining whether the current working mode of the primary user has changed is responsive to a programmable time interval.

* * * * *